United States Patent
Muto et al.

(10) Patent No.: US 7,456,986 B2
(45) Date of Patent: Nov. 25, 2008

(54) IMAGE PROCESSING APPARATUS FOR PROCESSING IMAGE DATA BASED ON OUTPUT ORDER

(75) Inventors: Takeshi Muto, Nara (JP); Kouji Miyake, Yamatokooriyama (JP); Kazuhiro Mizude, Souraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 907 days.

(21) Appl. No.: 10/418,330

(22) Filed: Apr. 17, 2003

(65) Prior Publication Data
US 2003/0202201 A1 Oct. 30, 2003

(30) Foreign Application Priority Data
Apr. 24, 2002 (JP) ............................. 2002-122975

(51) Int. Cl.
*G06F 15/00* (2006.01)
*G06K 1/00* (2006.01)

(52) U.S. Cl. ...................................... 358/1.15; 358/1.1
(58) Field of Classification Search .................. 358/1.1, 358/1.9, 1.11–1.18
See application file for complete search history.

(56) References Cited

U.S. PATENT DOCUMENTS

| | | | |
|---|---|---|---|
| 5,754,744 A | 5/1998 | Matsumoto et al. | |
| 5,944,824 A | 8/1999 | He | |
| 6,108,687 A | 8/2000 | Craig | |
| 6,469,796 B1 * | 10/2002 | Leiman et al. | 358/1.15 |
| 6,894,792 B1 * | 5/2005 | Abe | 358/1.15 |
| 2001/0043358 A1 | 11/2001 | Schwartz | |
| 2002/0138558 A1 * | 9/2002 | Ferlitsch | 709/203 |

FOREIGN PATENT DOCUMENTS

JP 3-28923 2/1991

* cited by examiner

*Primary Examiner*—Edward L. Coles
*Assistant Examiner*—Thierry L Pham
(74) *Attorney, Agent, or Firm*—David G. Conlin; Steven M. Jensen; Edwards Angell Palmer & Dodge LLP

(57) ABSTRACT

When a request for a change in output information and output order of, or cancellation of an output process of, image data obtained from computers 3 is made by a user, a print server apparatus 1 notifies other users of requested change content and obtains from each user an instruction indicating whether to permit a change process based on the notified change content or not. With this image processing apparatus, when a plurality of users make requests for output processes of respective image data and a change in output order of each image data or the like is requested, other users can confirm the change content and get to other work appropriately so as to enhance the work efficiency.

13 Claims, 11 Drawing Sheets

FIG. 4

| OUTPUT STATE CONFIRMATION SCREEN | | | | | |
|---|---|---|---|---|---|
| ORDER | FILE NAME | SIZE | PAGE | TIME REQUIRED | REQUESTER |
| 1 | aaaaa.aaa | a.aMB | 12/6 | aa:aa | A |
| 2 | bbbbb.bbb | b.bMB | 50/5 | bb:bb | B |
| 3 | ccccc.ccc | c.cMB | 4/4 | cc:cc | C |
| 4 | ddddd.ddd | d.dMB | 3/3 | dd:dd | D |
| 5 | eeeee.eee | e.eMB | 2/2 | ee:ee | E |
| 6 | fffff.fff | f.fMB | 100/1 | ff:ff | F |

37

ORDER CHANGE | CANCELLATION | CONDITION CHANGE | DECISION

| OUTPUT STATE CONFIRMATION SCREEN 38 | | | | |
|---|---|---|---|---|
| ORDER | FILE NAME | SIZE | PAGE | TIME REQUIRED | REQUESTER |
| 1 | aaaaa.aaa | a.aMB | 12/6 | aa:aa | A |
| 2 | bbbbb.bbb | b.bMB | 50/5 | bb:bb | B |
| 3 | ccccc.ccc | c.cMB | 4/4 | cc:cc | C |
| 4 | ddddd.ddd | d.dMB | 3/3 | dd:dd | D |
| 5 | eeeee.eee | e.eMB | 20/2 | ee:ee | E |
| 6 | fffff.fff | f.fMB | 100/1 | ff:ff | F |

ORDER CHANGE | CANCELLATION | CONDITION CHANGE | DECISION

```
┌─────────────────────────────────────────────────────────────┐
│ CHANGE CONTENT CONFIRMATION SCREEN                          │
│                                                             │
│ eeeee.eee OF REQUESTER : E IS TO BE CHANGED.                │
│     PAGE : 20/2 → 20/4                                      │
│ TIME REQUIRED IS SUPPOSED TO BE ee:ee → gg:gg.              │
│                                                             │
│                                                             │
│ DO YOU PERMIT THIS CHANGE ?                                 │
│                                                             │
│                      ┌───────┐   ┌───────┐                  │
│                      │ YES   │   │ NO    │                  │
│                      └───────┘   └───────┘                  │
│                                                             │
└─────────────────────────────────────────────────────────────┘
```

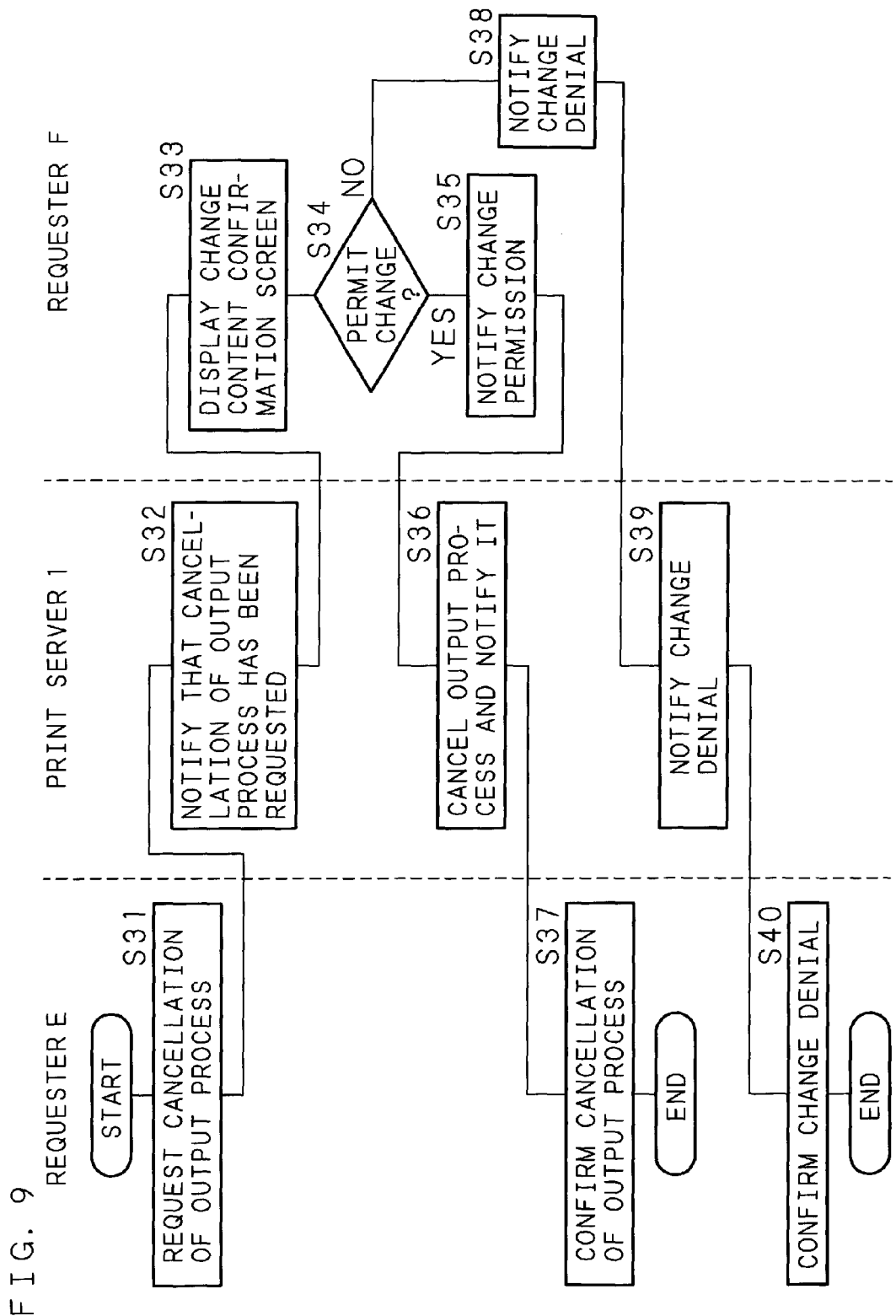

FIG. 10

OUTPUT STATE CONFIRMATION SCREEN

| ORDER | FILE NAME | SIZE | PAGE | TIME REQUIRED | REQUESTER |
|---|---|---|---|---|---|
| 1 | aaaaa.aaa | a.aMB | 12/6 | aa:aa | A |
| 2 | bbbbb.bbb | b.bMB | 50/5 | bb:bb | B |
| 3 | ccccc.ccc | c.cMB | 4/4 | cc:cc | C |
| 4 | ddddd.ddd | d.dMB | 3/3 | dd:dd | D |
| 5 | eeeee.eee | e.eMB | 2/2 | ee:ee | E |
| 6 | fffff.fff | f.fMB | 100/1 | ff:ff | F |

37

ORDER CHANGE | CANCEL-LATION | CONDITION CHANGE | DECISION

```
┌─────────────────────────────────────────────────┐
│ CHANGE CONTENT CONFIRMATION SCREEN              │
├─────────────────────────────────────────────────┤
│                                                 │
│   eeeee.eee OF REQUESTER : E IS TO BE CANCELED. │
│                                                 │
│                                                 │
│                                                 │
│   DO YOU PERMIT THIS CANCELLATION ?             │
│                                                 │
│              ┌───────┐      ┌───────┐           │
│              │ YES   │      │  NO   │           │
│              └───────┘      └───────┘           │
│                                                 │
└─────────────────────────────────────────────────┘
```

IMAGE PROCESSING APPARATUS FOR PROCESSING IMAGE DATA BASED ON OUTPUT ORDER

BACKGROUND OF THE INVENTION

1. Field of the Invention

The present invention relates to an image processing apparatus which receives plural pieces of image data and plural pieces of output information related to the image data from one or a plurality of communication devices, decides output order of the image data and outputs the image data based on the output information according to the decided output order.

2. Description of Related Art

As regards processing time of various kinds of processes which use a computer, the output time required for an output process for outputting image data stored in the computer onto a paper sheet or the like by a printer connected with the computer is often longer than processing time required for other processes.

Consequently, a user who has made a request to the printer for an output process can not grasp output time required for the output process precisely and has to stop his work to check the transitional state of the output process several times before the completion of the output process. Moreover, a user who has made a request for an output process to a printer which is located apart from his computer has to go over to the place where the printer is located to obtain a paper sheet on which desired image data is recorded, and when the output process has not been completed yet, he has to wait for the completion of the output process beside the printer. Such a state causes a problem that the working efficiency declines.

Japanese Patent Application Laid-Open No. 3-28923 (1991) has accordingly proposed a printer which is constructed to calculate output time required for an output process and notify a user of the calculation result when the user makes a request for the output process.

When a user makes a request to such a printer for an output process, the printer calculates output time required for the output process of image data on the basis of the volume of the image data to be outputted and the output performance of the printer and displays the calculated output time at a display unit of a computer used by the user. Moreover, after the output process starts, the printer calculates, at predetermined timing, time remaining until output of the image data in the course of execution of the output process is completed and notifies the user, by the same method, of the calculated time remaining until the output process is completed.

With this structure, the user can grasp the completion time of the output process approximately precisely by referring to the output time, the time remaining until the output process is completed and the like which are displayed on his computer. In this manner, there is no necessity for the user to stop his work in order to confirm the completion of the output process, and thereby a decrease in the working efficiency can be prevented.

There is another printer which is constructed to change the output order of each image data in response to user's request when plural pieces of image data in an execution queue for output processing are accumulated. The respective image data can be outputted in appropriate order by using such a printer to execute output processes of the respective image data in order desired by the user. With such a printer, there is no necessity for a user in an urgent situation, for example, to wait for the completion of the output process uselessly, and thereby the working efficiency can be enhanced.

When a printer constructed in this manner is shared by a plurality of computers via a network, however, the printer obtains image data to be outputted respectively from the computers. In this case, it is extremely difficult to calculate completion time of output processes of the respective image data precisely in accordance with output time calculated on the basis of the volume of the respective image data to be outputted and the output performance of the printer. It is also difficult to notify each user of the calculated completion time of each output process since there is a plurality of users requesting output processes.

Furthermore, there may arise a problem that a trouble occurs among users since a change in execution order of output processes performed in response to a request from a user affects the termination time of output processes requested by other users.

As described above, when a printer constructed as above is shared by a plurality of computers via a network, there arises a problem that the working efficiency of users can not be enhanced easily.

BRIEF SUMMARY OF THE INVENTION

The present invention has been made with the aim of solving the above problems, and it is an object thereof to provide an image processing apparatus, which is shared by a plurality of users, for displaying change information to notify other users of the change information when a user has changed output information and output order of each image data.

It is another object of the present invention to provide an image processing apparatus for outputting each image data according to the height of priority in the output order.

It is another object of the present invention to provide an image processing apparatus for prohibiting a change in the output order related to image data having a priority equal to or higher than a predetermined level.

It is another object of the present invention to provide an image processing apparatus for executing a change process only when the change process is permitted, so as not to cause discomfort in other users.

It is another object of the present invention to provide an image processing apparatus for executing a change process only for output information and output order related to image data for which a change process is permitted and prohibiting execution of a change process for output information and output order related to image data for which a change process is not permitted.

It is another object of the present invention to provide an image processing apparatus for notifying each user of change information at a communication device which has requested execution of an output process of the image data.

It is another object of the present invention to provide an image processing apparatus for notifying each user of change information at a communication device which has requested execution of an output process of image data which is to be affected by the change process based on the change information.

It is another object of the present invention to provide an image processing apparatus for notifying each user of change information at a plurality of communication devices which have received the change information.

It is another object of the present invention to provide an image processing apparatus with which each user can confirm the data volume, data name, device identifying data and output time of each image data included in the change information and decide appropriately whether to permit the change process or not, so that a decrease in his working efficiency can be prevented.

It is another object of the present invention to provide an image processing apparatus with which users can refer to each image data to be outputted, grasp image data more easily and decide appropriately whether to permit the change process or not, so that a decrease in his working efficiency can be prevented.

It is another object of the present invention to provide an image processing apparatus for notifying each user of output completion date and time of each image data.

It is another object of the present invention to provide an image processing apparatus capable of changing the output order, changing the output information and canceling execution of an output process even after execution of the output process has been requested.

It is another object of the present invention to provide an image processing apparatus capable of changing each setting of an output process even after execution of the output process has been requested.

An image processing apparatus according to the present invention receives plural pieces of image data and plural pieces of output information related to the image data from one or a plurality of communication devices, decides output order of the image data and outputs the image data based on the output information according to the decided output order. The image processing apparatus comprises: information obtaining means for obtaining change information to be used for changing the output information and the output order; display means for displaying the change information obtained by the information obtaining means; change means for changing the output information and the output order on the basis of the change information obtained by the information obtaining means; and output means for outputting the image data based on the output information according to the output order changed by the change means.

This invention can realize an image processing apparatus, which is constructed to obtain change information to be used for changing output information and output order received from a communication device and to display the obtained change information, for displaying the change information and notifying each user of the change information when change means changes the output information and the output order of each image data on the basis of the change information.

Accordingly, when a user makes a request for a change in output order of each image data or the like and the output order is changed at the image processing apparatus shared by a plurality of users, other users can confirm the change information so as to confirm the change in the output order. Consequently, each user can appropriately get to other work according to the change information so as to enhance the work efficiency.

In the image processing apparatus according to the present invention, each image data may have a priority in output order. In this case, the information obtaining means is constructed to obtain the change information on the basis of the priority. This invention can realize an image processing apparatus for outputting each image data according to the height of the priority.

Accordingly, when a high level of priority is set for image data requested by a user in a supervisory position, for example, business can proceed smoothly and the working efficiency can be enhanced by prioritizing the execution of an output process requested by the user in a supervisory position.

The image processing apparatus according to the present invention may further comprise judging means for judging whether the priority is equal to or higher than a predetermined level or not. In this case, the information obtaining means is constructed to obtain change information to be used for changing output order of image data having a priority which the judging means has judged is lower than the predetermined level. This invention can realize an image processing apparatus for prohibiting a change in output order of image data which has a priority equal to or higher than the predetermined level.

Accordingly, even when a user in a nonsupervisory position makes a request for a change in execution order of an output process or the like, for example, the execution order of the output process requested by the user in a supervisory position is not changed. With this structure prioritizing the execution of an output process requested by a user in a supervisory position, business can proceed smoothly and the working efficiency can be enhanced.

The image processing apparatus according to the present invention may further comprise permission obtaining means for obtaining permission to change the output information and the output order. In this case, the change means is constructed to change the output information and the output order on the basis of the change information when the permission obtaining means has obtained the permission. This invention can realize an image processing apparatus for performing a change process only when the change process is permitted, i.e., for executing a permitted change process without causing discomfort in other users.

In the image processing apparatus according to the present invention, the permission obtaining means may be constructed to obtain permission for each image data. Moreover, the change means may be constructed to change output information and output order of image data for which the permission obtaining means has obtained permission. This invention can realize an image processing apparatus for executing a change process only for output information and output order related to image data for which a change process has been permitted and prohibiting execution of a change process of output information and output order related to image data for which a change process has not been permitted.

Accordingly, when a change in output order of a piece of image data is requested and users requesting output processes of other pieces of image data do not give permission to change the output order, for example, the execution of the output process for which a business has been requested is prioritized by changing the output order of image data within a permitted range and not changing the output order of image data for which a change is not permitted. Moreover, the change process does not affect an output process of image data for which a change is not permitted, and thereby the working efficiency of each user can be enhanced.

The image processing apparatus of the present invention may further comprise transmitting means for transmitting the change information to a communication device which has transmitted image data. This invention can realize an image processing apparatus for notifying each user of the change information at each communication device which has requested execution of an output process of image data.

Accordingly, when a change in output order of an output process in an urgent situation is requested and the change process is notified to other users at each communication device requesting an output process, there is a hope that a user requesting an output process in a non-urgent situation cancels his output process or the like. When the user cancels his output process or the like, the working efficiency of other users can be enhanced.

With respect to the image processing apparatus according to the present invention, the communication device to which change information is transmitted may be a communication device which has transmitted image data having output information and output order to be changed on the basis of the change information. This invention can realize an image processing apparatus for notifying each user of the change information at a communication apparatus which has requested execution of an output process of image data which is to be affected by a change process based on the change information.

Accordingly, by not transmitting change information to a communication device which has requested execution of an output process of image data which is not affected by the change process, occurrence of confusion in each user can be prevented and permission for the change process can be obtained appropriately.

The image processing apparatus according to the present invention may be connected with a plurality of communication devices allowing mutual communications and may further comprise transmitting means for transmitting the change information to the communication devices. This invention can realize an image processing apparatus for notifying each user of the change information at communication devices which receive the change information.

Accordingly, when a change in output order of an output process in an urgent situation is requested, a new request for an output process by another user can be deterred by notifying other users of the change process even at a communication apparatus which has not requested an output process of image data. Consequently, when a plurality of image processing apparatuses is provided in the network, another user can make his new request for an output process to another image processing apparatus and the working efficiency of each user can be enhanced.

In the image processing apparatus according to the present invention, the change information may include a data volume of the image data, a data name indicating the image data and device identifying data for identifying a communication device which has transmitted the image data. Moreover, the image processing apparatus may further comprise calculating means for calculating output time required for outputting the image data on the basis of the data volume of the image data. In this case, the display means is constructed to display the data volume, the data name, the device identifying data and the output time calculated by the calculating means. With this invention, each user can appropriately decide whether to permit the change process or not after confirming the data volume, data name, device identifying data and output time of each image data included in the change information. Consequently, an image processing apparatus which can prevent a decrease in user's working efficiency can be realized.

In the image processing apparatus according to the present invention, the display means may include means for displaying the image data in a predetermined size. With this invention wherein the display means includes means for displaying image data to be outputted in a predetermined size by performing size reduction or pixel skipping, the user can appropriately decide whether to permit a change process or not while referring to each image data for which the output process has been requested so as to grasp image data more easily. Consequently, an image processing apparatus which can prevent a decrease in user's working efficiency can be realized.

The image processing apparatus according to the present invention may further comprise accepting means for accepting output completion date and time, which is desired by each user, of each image data. Moreover, the display means may include means for displaying output completion date and time accepted through the accepting means. This invention can realize an image processing apparatus for notifying each user of output completion date and time of each image data.

Accordingly, when a user referring to output completion date and time of each data desired by each user has requested an output process in a non-urgent situation, there is a hope that he puts his output process in a lower order in order to prioritize execution of an output process of another user. By outputting each image data in order according to the output completion date and time, the work efficiency of each user can be enhanced.

In the image processing apparatus according to the present invention, the change information may include an instruction on a change in output order of the image data, an instruction on a change in output information related to the image data and an instruction on output cancellation of the image data. This invention can realize an image processing apparatus capable of changing output order, changing output information and canceling execution of an output process after a request for execution of the output process has been made.

Accordingly, when there are plural pieces of image data in an execution queue for output processing, a user requesting an output process in a non-urgent situation can change the output order or cancel his output process in order to reduce the load of the image processing apparatus, so as to prioritize execution of an output process of another user in an urgent situation.

In the image processing apparatus according to the present invention, the output information may include the number of copies of the image data to be outputted, the number of pages of the image data to be outputted, a selection from color output and monochrome output, a selection from double-side output and single-side output and an instruction about an operation to be performed after outputting the image data. This invention can realize an image processing apparatus capable of changing each setting of an output process after a request for execution of the output process has been made.

Accordingly, when there are plural pieces of image data in an execution queue for output processing, the load of the image processing apparatus can be reduced and the working efficiency of each user waiting for execution of his output process can be enhanced by, for example, changing the number of pages of image data to be outputted or the like.

The above and further objects and features of the invention will more fully be apparent from the following detailed description with accompanying drawings.

BRIEF DESCRIPTION OF THE SEVERAL
VIEWS OF THE DRAWINGS

FIG. 4 is a view for illustrating an example of an output state confirmation screen;

FIG. 7 is a view for illustrating an example of an output state confirmation screen;

FIG. 8 is a view for illustrating an example of a change content confirmation screen;

FIG. 9 is a flow chart for showing a cancellation process of an output process performed at a print server;

FIG. 10 is a view for illustrating an example of an output state confirmation screen; and FIG. 11 is a view for illustrating an example of a change content confirmation screen.

DETAILED DESCRIPTION OF THE INVENTION

Figure 1:
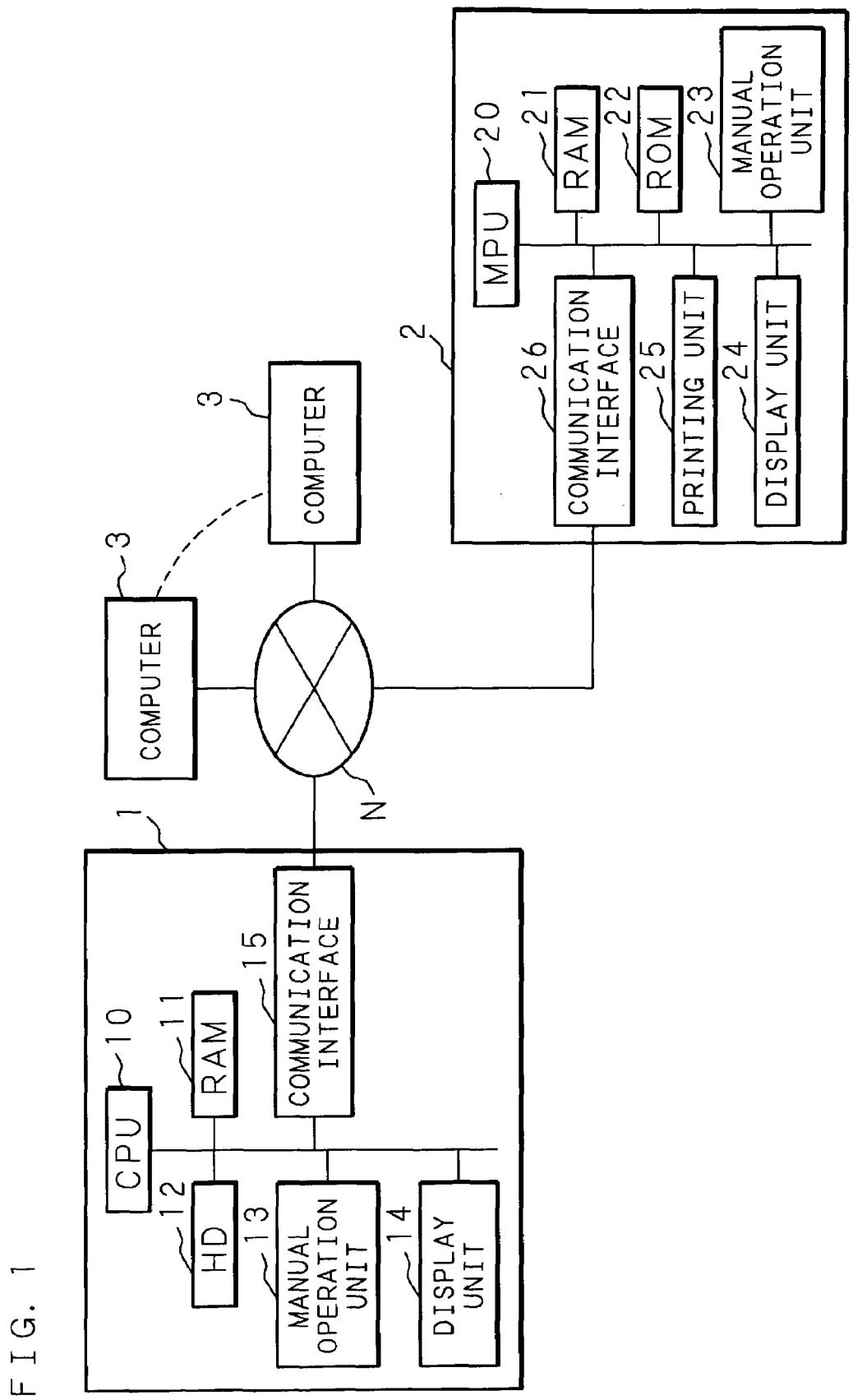
FIGS. 1 and 2 are block diagrams for showing the structure of an image processing apparatus according to the present invention.
Figure 2:
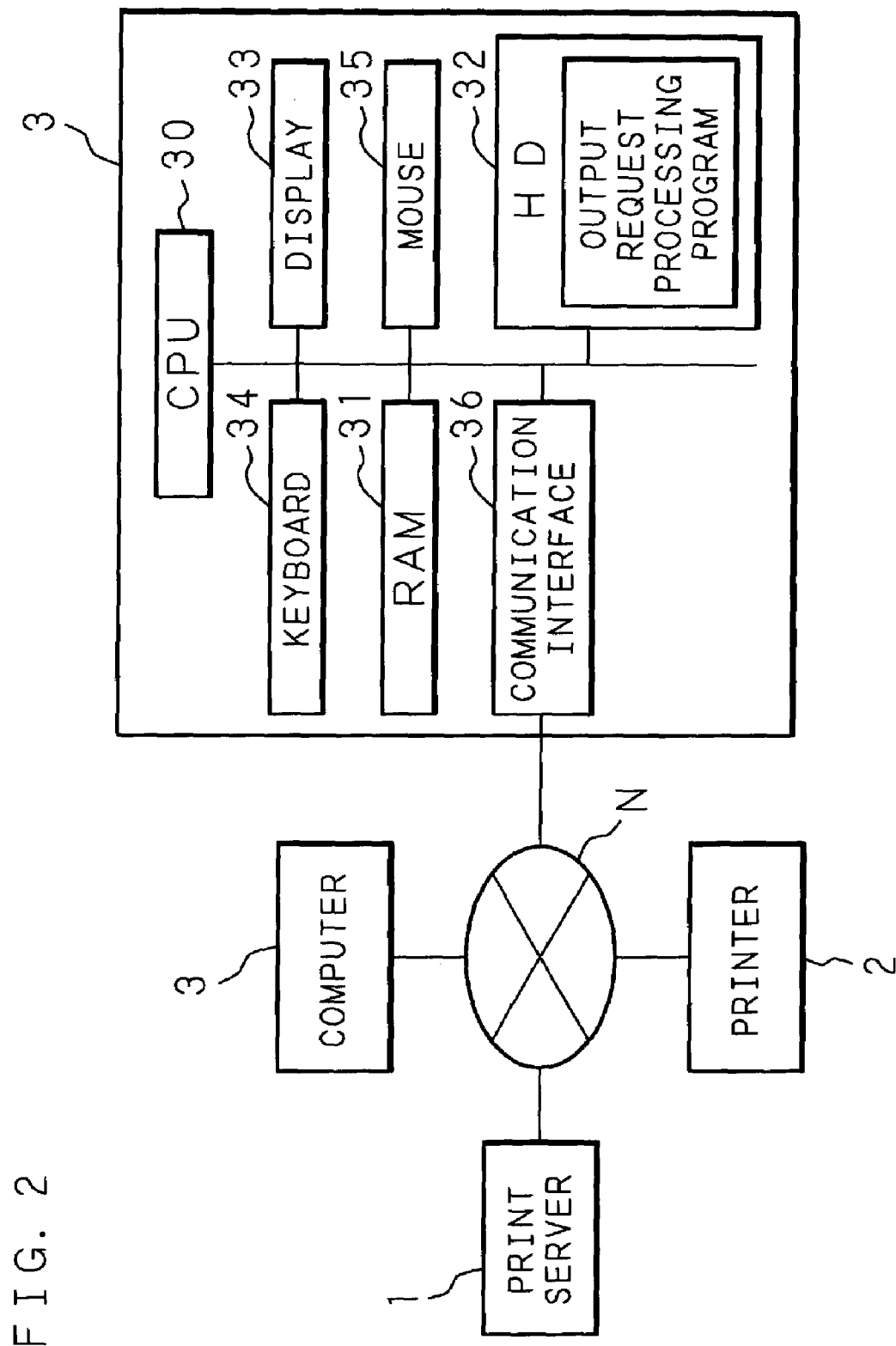

The following description will explain an image processing apparatus according to the present invention in detail on the basis of an embodiment wherein the apparatus is used as a print server comprising a printer as output means. FIGS. 1 and 2 are block diagrams for showing the structure of the image processing apparatus according to the present invention. The reference numeral 1 in the figures indicates a print server and the reference numeral 2 indicates a printer functioning as output means.

The print server 1 is connected with the printer 2 via a network N. The network N is further connected with a plurality of computers 3 functioning as clients of the print server 1.

The print server 1 receives image data from each computer 3, decides output order on the basis of a priority of each image data or the like and transmits each image data to the printer 2 according to the decided output order. Upon receiving each image data, the printer 2 outputs image data onto a predetermined paper sheet, OHP (Over Head Projector) sheet or the like.

Each user can confirm a transitional state of an output process of each data by making a computer 3 he uses display an output state confirmation screen to be used for confirming an output state of the printer 2 and can make a request for a change in output information related to each image data, a change in output order of each image data, cancellation of each output process or the like, using the output state confirmation screen. The print server 1 is constructed to perform a change in output information related to each image data, a change in output order of each image data, cancellation of each output process or the like, in response to each request made by each user as mentioned above.

The print server 1 comprises a CPU 10, a RAM 11, a hard disk (which is hereinafter referred to as an HD) 12, a manual operation unit 13, a display unit 14, a communication interface 15 to be used for communicating with the outside and the like.

The CPU 10 is connected with each hardware element mentioned above of the print server 1 via a bus so as to control each hardware element and successively perform computer programs stored in the HD 12.

The RAM 11, which is composed of an SRAM, a DRAM, a flash memory and the like, stores temporary data generated in the course of execution of a computer program by the CPU 10. The RAM 11 also stores image data to be outputted, which has been obtained from each computer 3.

The HD 12 stores in advance various kinds of computer programs required for operations of the print server 1 and a program for calculating output time required for outputting image data on the basis of the output performance of the printer 2 and the volume of the image data to be outputted.

The display unit 14 is a display device, such as a liquid crystal display (LCD) or a CRT display, for displaying the state of output processes of respective image data to be outputted, which has been obtained from computers 3, and the like.

The manual operation unit 13 comprises keys for character input, ten-key keypad, various kinds of function keys and the like to be used for operating the print server 1. Accordingly, a user who has requested an output process can make a request for a change in output information related to each image data, a change in output order of each image data, cancellation of each output process and the like, using the print server 1 as well as his computer 3.

The printer 2 comprises an MPU (Microprocessor Unit) 20, a RAM 21, a ROM 22, a manual operation unit 23, a display unit 24, a printing unit 25, a communication interface 26 to be used for communicating with the outside and the like.

The MPU 20 is connected with each hardware element mentioned above of the printer 2 via a bus so as to control each hardware element and successively perform computer programs stored in the ROM 22.

The RAM 21, which is composed of an SRAM, a DRAM, a flash memory and the like, stores temporary data generated in the course of execution of a computer program by the MPU 20.

The ROM 22 stores in advance various kinds of computer programs required for operations of the printer 2.

The display unit 24 is a display device, such as a liquid crystal display (LCD) or a CRT display, for displaying the state of output processes of respective image data to be outputted, which has been obtained from the print server 1, and the like.

The manual operation unit 23 comprises keys for character input, ten-key keypad, various kinds of function keys and the like to be used for operating the printer 2.

The printing unit 25 is a photo type printer for recording image data received from the print server 1 as hard copy onto a paper sheet, an OHP sheet or the like of an optimum size, which is selected from paper sheets, OHP sheets or the like of various sizes such as A3 size for portrait printing, B4 size for portrait printing, A4 size for portrait printing, B5 size for landscape printing and A5 size for landscape printing.

The computer 3 comprises a CPU 30, a RAM 31, an HD 32, a display 33, a keyboard 34, a mouse 35, a communication interface 36 to be used for communicating with the outside and the like.

The CPU 30 is connected with each hardware element mentioned above of the computer 3 via a bus so as to control each hardware element and successively perform computer programs stored in the HD 32.

The RAM 31, which is composed of an SRAM, a DRAM, a flash memory and the like, stores temporary data generated in the course of execution of a computer program by the CPU 30.

The HD 32 stores in advance various kinds of computer programs required for operations of the computer 3 and an output request processing program for requesting an output process of image data by the printer 2 from the print server 1.

With respect to the print server 1 and the printer 2 constructed as above, each user requests an output process by the printer 2 from the print server 1 via the network N from a computer 3 he uses. The print server 1 obtains image data and output information related to the image data from each computer 3 and decides output order of each image data according to the obtained order and a priority of each image data in the output order. The print server 1 transmits each image data and output information to the printer 2 in the decided output order so as to output each image data by the printer 2 on the basis of the output information.

Each user who wants to confirm an output state of image data at the printer 2 can make an output state confirmation screen displayed on the display 33 to grasp precisely the state of an output process, which he has requested, using the output state confirmation screen.

Figure 3:
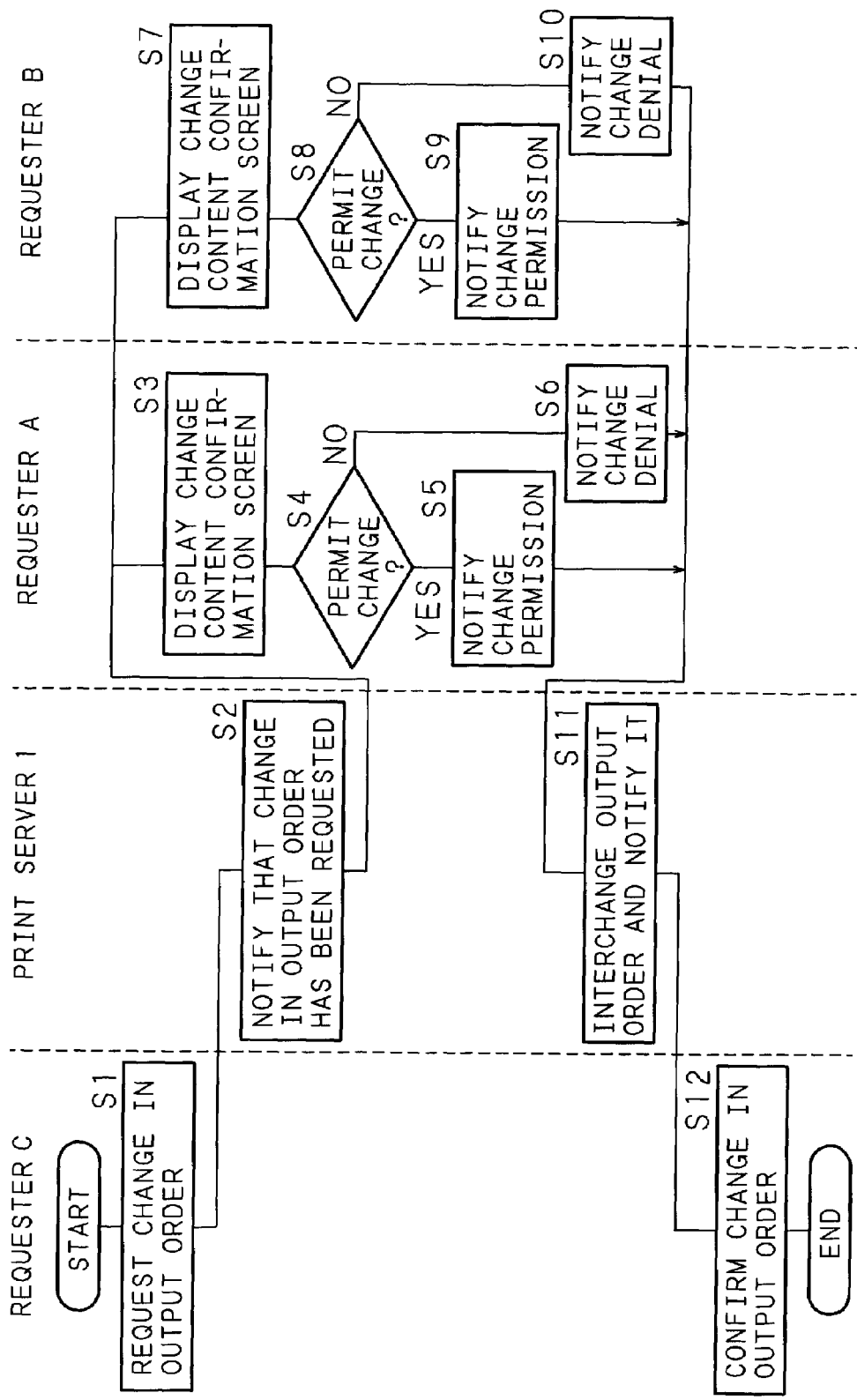
FIG. 3 is a flow chart for showing a change process of output order of image data performed at a print server.

The following description will explain a change process of output order of image data performed by the print server 1 constructed as above. FIG. 3 is a flow chart for showing a change process of output order of image data performed at the print server 1.

This embodiment will explain a case where a requester C of the third priority in the output order makes a request for making his own output process cut ahead of an output process requested by a requester A of the first priority in the output order.

The requester C who wants to change the order of output processes makes an output state confirmation screen of the printer 2 displayed on the display 33 of his computer 3. FIG. 4 is a view for illustrating an example of an output state confirmation screen wherein the output state of the printer 2 is displayed on the upper portion and operation buttons to be used for operating the output state confirmation screen are displayed on the lower portion.

The output state displayed on the screen is shown under the headings including Order, File Name, Size, Page, Time Required and Requester which are arranged in this order from the left side. The Order indicates output order, the File Name indicates the data name designating image data to be outputted, the Size indicates the volume of the image data, the Page indicates the number of pages and the number of copies of the image data to be outputted, the Time Required indicates output time calculated by the print server 1 and the Requester indicates a requester who has requested the output process of the image data or device identifying data for identifying the computer 3. The output state displayed on the screen may further include acceptance time indicating when the output process was requested, estimated termination time of the output process, a selection from single-side output and double-side output, a selection from color output and monochrome output, image data to be outputted which has undergone size reduction or the like to have a predetermined size and the like.

The operation buttons arranged on the lower portion of the output state confirmation screen includes an upward button, a downward button, a leftward button, a rightward button, an order changing button, a cancellation button, a condition changing button and a decision button. The order changing button is operated in order to change order of output processes, the cancellation button is operated in order to request cancellation of an output process, the condition changing button is operated in order to request a change in the number of pages, the number of copies or the like of the image data to be outputted and the decision button is operated in order to determine a specified change condition. It should be noted that the aforementioned operation buttons may be allocated to function keys provided at computers 3.

A cursor 37 is displayed at the left side of the Order on the output state confirmation screen. The requester C who wants to change the order of output processes clicks the mouse 35 at the upward button or the downward button of operation buttons to place the cursor 37 at a position indicating the output process which he has requested and then clicks the mouse 35 at the order changing button. It should be noted that the curser 37 can be displaced not only by clicking the mouse at operation buttons but also by operating ten-key keypad arranged at the keyboard 34 provided at the computer 3 or the like.

When the requester C clicks the mouse at the order changing button, the computer 3 flashes the cursor 37. Upon confirming the flashing order changing button, the requester C displaces the cursor 37 to a position where he wants to make his output process cut ahead, i.e., a position indicating an output process of the first priority in the output order in this embodiment for making the output process of the requester C cut ahead the output process of the requester A (the sate is not illustrated in the figure) and clicks the mouse at the decision button.

In this manner, the computer 3 of the requester C requests a change in output order from the print server 1 (step S1). The print server 1 which has accepted the request for a change in output order from the requester C notifies other users that the change in the output order has been requested (step S2). In this case where the output process of the requester C of the third priority in the output order cuts ahead of the output process of the requester A of the first priority in the output order, output processes to be affected by the change in the output order are the output process of the requester A and the output process of a requester B. Consequently, the print server 1 notifies the requester A and the requester B that the requester C has made a request for a change in the output order.

It should be noted that the change in the output order may be notified to each computer 3 connected with the print server 1 via the network N or notified to requesters A, B, D, E and F who have made requests for output processes.

Figure 5:
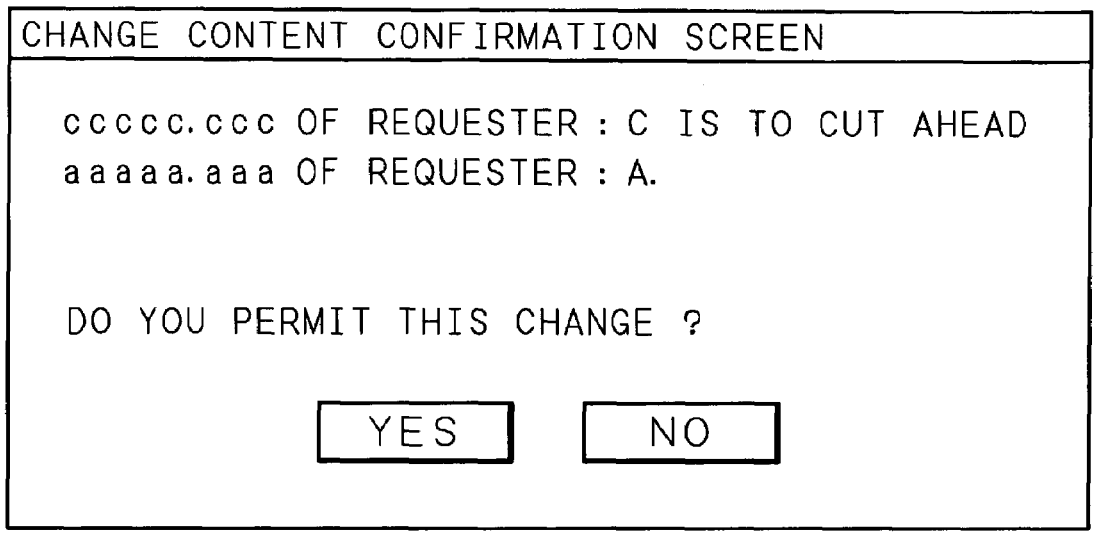
FIG. 5 is a view for illustrating an example of a change content confirmation screen.

Being notified by the print server 1 that a change in output order has been requested, the requester A and the requester B make a change content confirmation screen displayed on their displays 33 (step S3, S7). FIG. 5 is a view for illustrating an example of a change content confirmation screen. The requester A and the requester B who have received the request for change permission confirm the change content displayed on the change content confirmation screen and then decide permission or denial of a change process by clicking the mouse 35 at an "YES" button or a "NO" button (step S4, S8).

When a requester clicks the mouse at the "YES" button, the computer 3 notifies the print server 1 of change permission (step S5, S9). When a requester clicks the mouse at the "NO" button, the computer 3 notifies the print server 1 of the denial of a change process (step S6, S10).

After each computer 3 notifies permission or denial of a change process, the print server 1 interchanges output order within a range of output processes of users who have given permission to the output process and notifies the requester C of the new output order after the change (step S11). The requester C confirms the change in the output order by making the output state confirmation screen displayed again on his display 33 or the like (step S12).

It should be noted that, when the requester A does not permit the change process of the output order at the print server 1 and the requester B permits the change process in the above example, it is allowed to interchange the output process of the requester C who has requested the change process and the output process of the requester B. On the other hand, when the requester A permits the change process and the requester B does not permits the change process, it is judged whether the output time required for the output process of the requester C is shorter than the output time required for the output process of the requester A or not. When the output time required for the output process of the requester C is shorter than the output time required for the output process of the requester A, the interchange between the output process of the requester C and the output process of the requester A, which does not affect the output completion time of the output process of the requester B, can be performed.

As described above, by notifying each user to be affected by a change in output order of the content of a change process, making each user confirm whether to permit execution of the change process or not and changing output order of image data for which the change process has been permitted, it is made possible to prevent a change in output order of image data for which a change is not permitted, to prevent occurrence of discomfort in other users and to prevent occurrence of a trouble among users.

Moreover, the print server 1 may be constructed to notify the superior of the user who has requested the change process of the change content and perform the change process after obtaining the superior's permission. Furthermore, the print server 1 may be constructed to make completion date and time of the output process desired by each requester displayed on the output state confirmation screen so as to prioritize execution of an output process with earlier desired date and time through the good offices of other users.

Figure 6:
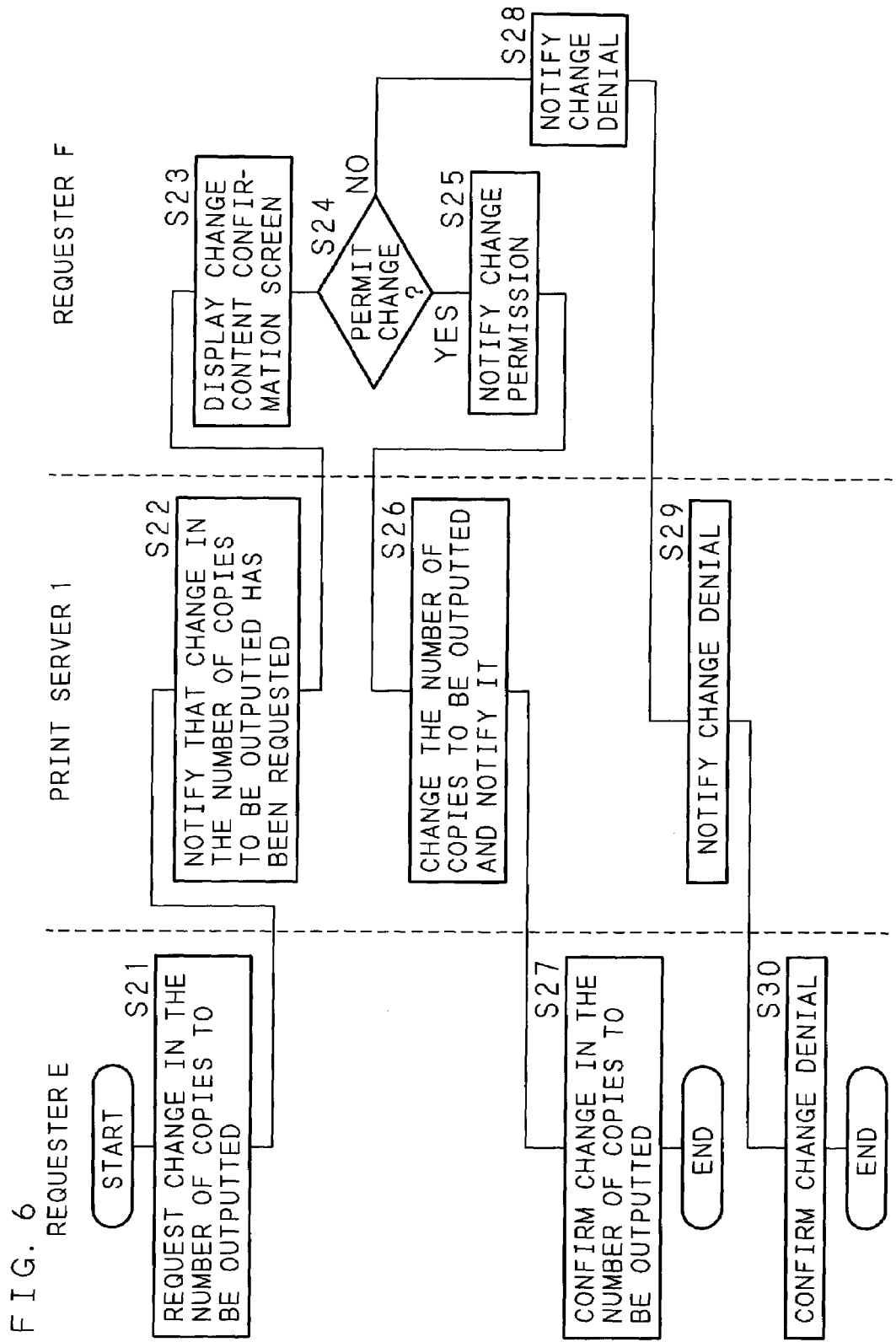
FIG. 6 is a flow chart for showing a change process of output information of image data performed at a print server.

The following description will explain a change process of output information related to image data performed by the print server 1 constructed as above. FIG. 6 is a flow chart for showing a change process of output information of image data performed at the print server 1.

This embodiment will explain a case where a requester E of the fifth priority in the output order makes a request for a change in the number of copies to be outputted of his output information. The requester E who wants to change the number of copies to be outputted makes an output state confirmation screen of the printer 2 displayed on the display 33 of his computer 3. FIG. 7 is a view for illustrating an example of an output state confirmation screen having the same form as that shown in FIG. 4.

The requester E places the cursor 37 at a position indicating his output process on the output state confirmation screen and clicks the mouse 35 at the condition changing button in order to change the number of copies to be outputted in the output process which he has requested. When the requester E clicks the mouse at the condition changing button, the computer displays the output state confirmation screen with a line indicating an output process of the requester E and a line indicating an output process of the requester F being arranged at a predetermined space and displays a pointer 38, at the predetermined space, for pointing each element of output information of the output process of the requester E.

The requester E displaces the pointer 38 to a position indicating the number of copies and clicks the mouse 35 at the decision button. When the requester E clicks the mouse at the decision button, the computer 3 displays a screen (which is not illustrated in the figure) to be used for setting the number of copies to be changed to on the display 33. According to the instruction of the screen, the requester E specifies the number of copies to be changed to.

In this manner, the computer 3 of the requester E requests the print server 1 of a change in the number of copies to be outputted (step S21). The print server 1 which has accepted the request for the change in the number of copies to be outputted from the requester E notifies other users that the change in the number of copies to be outputted has been requested (step S22). It should be noted that, in this case where the change in the number of copies to be outputted of the requester E mentioned above affects only the output process of the requester F, the print server 1 notifies the requester F that the requester E has made a request for a change in the number of copies to be outputted. It should be also noted that the change in the number of copies to be outputted may be notified to each computer 3 connected with the print server 1 via the network N or notified to requesters A, B, C, D and F requesting output processes.

Being notified by the print server 1 that a change in the number of copies to be outputted has been requested, the requester F makes a change content confirmation screen displayed on his display 33 (step S23). FIG. 8 is a view for illustrating an example of a change content confirmation screen. The requester F who has received a request for change permission decides permission or denial of a change process by clicking the mouse 35 at the "YES" button or the "NO" button after confirming the change content displayed on the change content confirmation screen (step S24).

When the requester F clicks the mouse at the "YES" button, the computer 3 notifies the print server 1 of the change permission (step S25). When the requester F clicks the mouse at the "NO" button, the computer 3 notifies the print server 1 of the denial of the change process (step S28).

When permission for the change process is notified by the requester F, the print server 1 changes the number of copies to be outputted and notifies the requester E of it (step S26). The requester E confirms the change in the number of copies to be outputted by making the output state confirmation screen displayed again on his display 33 or the like (step S27).

On the other hand, when denial of the change process is notified by the requester F, the print server 1 notifies the requester E of the denial of the change process of the number of copies to be outputted (step S29) so that the requester E confirms that the change process has not been permitted (step S30).

As described above, by notifying each user to be affected by the change in the number of copies to be outputted of the content of a change process, making each user confirm whether to permit execution of the change process or not and executing the change process when permission is given, it is possible to prevent occurrence of discomfort in other users and occurrence of a trouble among users.

The following description will explain a cancellation process of an output process performed by the print server 1 constructed as above. FIG. 9 is a flow chart for showing a cancellation process of an output process performed at the print server 1.

This embodiment will explain a case where a requester E of the fifth priority in the output order makes a request for cancellation of an output process which he has requested. The requester E who wants to cancel his output process makes an output state confirmation screen of the printer 2 displayed on the display 33 of his computer 3. FIG. 10 is a view for illustrating an example of an output state confirmation screen.

The requester E places the cursor 37 at a position indicating his output process on the output state confirmation screen and clicks the mouse 35 at the cancellation button in order to cancel the output process which he has requested. When the requester E clicks the mouse at the cancellation button, the computer 3 flashes the cursor 37. Upon confirming the flashing cancellation button, the requester E confirms whether the cursor 37 indicates a desired position or not and clicks the mouse at the decision button.

In this manner, the computer 3 of the requester E requests cancellation of an output process from the print server 1 (step S31). The print server 1 which has accepted the request for the cancellation of the output process from the requester E notifies other users that the cancellation of the output process has been requested (step S32). It should be noted that, since the cancellation of the output process of the requester E mentioned above affects only the output process of the requester F, the print server 1 notifies the requester F that the requester E has made a cancellation request of the output process. Moreover, the cancellation of the output process may be notified to each computer 3 connected with the print server 1 via the network N or notified to requesters A, B, C, D and F requesting output processes.

Being notified by the print server 1 that cancellation of an output process has been requested, the requester F makes a change content confirmation screen displayed on his display 33 (step S33). FIG. 11 is a view for illustrating an example of a change content confirmation screen. The requester F who has received a request for change permission decides permission or denial of a change process by clicking the mouse 35 at the "YES" button or the "NO" button after confirming the change content displayed on the change content confirmation screen (step S34).

When the requester F clicks the mouse at the "YES" button, the computer 3 notifies the print server 1 of the change permission (step S35). When the requester F clicks the mouse at the "NO" button, the computer 3 notifies the print server 1 of the denial of the change process (step S38).

When permission for the change process is notified by the requester F, the print server 1 cancels the output process and notifies the requester E of it (step S36). The requester E confirms the cancellation of the output process by making the output state confirmation screen displayed again on his display 33 or the like (step S37).

On the other hand, when denial of the change process is notified by the requester F, the print server 1 notifies the requester E of the denial of the cancellation process of the output process (step S39) so that the requester E confirms that the change process has not been permitted (step S40).

As described above, by notifying each user to be affected by the cancellation of the output process of the content of a change process, making each user confirm whether to permit execution of the change process or not and executing the change process when permission is given, it is possible to prevent occurrence of discomfort in other users and occurrence of a trouble among users.

Although the image processing apparatus constructed as above displays on the output state confirmation screen of the printer 2 output order, a file name, a data volume, the number of pages, time required and a requester, the image processing apparatus may be constructed to further display the image data to be outputted in a small size after performing size reduction or pixel skipping. Each image data can be grasped more easily in this case and, when permission for a change process is requested, each user can decide whether to permit the change process or not more appropriately. The condition change of each output process is not limited to a change in the number of copies to be outputted but may also be a change of a selection from color output and monochrome output, a change of a selection from single-side output and double-side output, a change of an operation to be performed after the output process or the like.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An image processing apparatus, which receives plural pieces of image data and plural pieces of output information related to the image data from at least one communication device, decides output order of the image data and outputs the image data based on the output information according to the decided output order, comprising:
   a controller capable of performing operations of:
      obtaining change information from a first requester to be used for changing the output information and the output order;
      notifying only a second requester whose output process is affected by the change information obtained from the first requester, the second requester being notified of the change information;
      obtaining permission from the second requester to change the output information and the output order; and
      changing the output information and the output order on the basis of the obtained change information when the permission has been granted by the second requester;
   a display unit for displaying the change information obtained by the controller; and
   an output unit for outputting the image data based on the output information according to the output order changed by the controller,
   wherein the first and second requesters are different users of the image processing apparatus.

2. The image processing apparatus according to claim 1, wherein each image data has a priority in output order, and the controller obtains the change information on the basis of the priority.

3. The image processing apparatus according to claim 2, wherein the controller is further capable of performing operations of:
   judging whether the priority is equal to or higher than a predetermined level or not; and
   obtaining change information to be used for changing output order of image data having a priority which the controller has judged is lower than the predetermined level.

4. The image processing apparatus according to claim 1, wherein the controller is further capable of performing operation of:
   obtaining the permission for each image data; and
   changing output information and output order related to image data for which the permission has been obtained.

5. The image processing apparatus according to claim 1, wherein the controller is further capable of transmitting the change information to a communication device.

6. The image processing apparatus according to claim 5, wherein the communication device to which the change information is transmitted is a communication device which has transmitted image data having output information and output order to be changed on the basis of the change information.

7. The image processing apparatus according to claim 1, which is connected with a plurality of communication devices allowing mutual communications, wherein the controller is further capable of transmitting the change information to the communication devices.

8. The image processing apparatus according to claim 1, wherein the change information includes a data volume of the image data, a data name indicating the image data and device identifying data for identifying a communication device which has transmitted the image data, the controller is further capable of calculating output time required for outputting the image data on the basis of the data volume of the image data, and the display unit displays the data volume, the data name, the device identifying data and the calculated output time.

9. The image processing apparatus according to claim 1, wherein the display unit displays the image data in a predetermined size.

10. The image processing apparatus according to claim 1, wherein the controller is further capable of accepting output completion date and time of each image data, and the display unit displays the output completion date and time accepted through the controller.

11. The image processing apparatus according to claim 1, wherein the change information includes an instruction on a change in output order of the image data, an instruction on a change in output information related to the image data and an instruction on output cancellation of the image data.

12. The image processing apparatus according to claim 1, wherein the output information includes the number of copies of the image data to be outputted, the number of pages of the image data to be outputted, a selection from color output and monochrome output, a selection from double-side output and single-side output and an instruction about an operation to be performed after outputting the image data.

13. An image processing apparatus, which receives plural pieces of image data and plural pieces of output information related to the image data from at least one communication device, decides output order of the image data and outputs the image data based on the output information according to the decided output order, comprising:

information obtaining means for obtaining change information from a first requester to be used for changing the output information and the output order;

display means for displaying the change information obtained by the information obtaining means;

means for notifying only a second requester whose output process is affected by the change information obtained from the first requester, the second requester being notified of the change information;

means for obtaining permission from the second requester to change the output information and the output order;

change means for changing the output information and the output order on the basis of the change information obtained by the information obtaining means when the permission has been granted by the second requester; and output means for outputting the image data based on the output information according to the output order changed by the change means, wherein the first and second requesters are different users of the image processing apparatus.

* * * * *